United States Patent [19]

Sakai

[11] Patent Number: 4,780,875
[45] Date of Patent: Oct. 25, 1988

[54] SEMICONDUCTOR MEMORY WITH REDUCED SIZE ECC CIRCUIT

[75] Inventor: Kikuo Sakai, Fussa, Japan

[73] Assignees: Hitachi, Ltd.; Hitachi VLSI Engineering Corp., both of Tokyo, Japan

[21] Appl. No.: 893,772

[22] Filed: Aug. 6, 1986

[30] Foreign Application Priority Data

Aug. 23, 1985 [JP] Japan .............................. 60-184232

[51] Int. Cl.⁴ ............................................. G06F 11/10
[52] U.S. Cl. .................................................... 371/38
[58] Field of Search ......................... 371/37, 38, 39, 40

[56] References Cited

U.S. PATENT DOCUMENTS

| | | | |
|---|---|---|---|
| 3,423,729 | 1/1969 | Heller | 371/39 |
| 4,206,440 | 6/1980 | Doi et al. | 371/39 |
| 4,562,578 | 12/1985 | Odaka et al. | 371/40 |
| 4,631,725 | 12/1986 | Takamura et al. | 371/39 |
| 4,641,309 | 2/1987 | Nakano et al. | 371/40 X |

OTHER PUBLICATIONS

Franco, Coding for Error-Free Communications, Electro-Technology, Jan. 1968, pp. 53-62.

Primary Examiner—Charles E. Atkinson
Attorney, Agent, or Firm—Antonelli, Terry & Wands

[57] ABSTRACT

A semiconductor memory incorporating an ECC circuit includes a memory array, means for selecting a plurality of bits which are to be simultaneously output to the outside of the IC from a plurality of bits which are simultaneously read out from the memory array, and an error correcting circuit which constitutes the ECC circuit. The selecting means is provided in a stage previous to the error correcting circuit. In consequence, it is possible to reduce the number of bits of a signal which need to be simultaneously processed by the error correcting circuit. Accordingly, the size of the ECC circuit can be reduced.

4 Claims, 3 Drawing Sheets

SEMICONDUCTOR MEMORY WITH REDUCED SIZE ECC CIRCUIT

BACKGROUND OF THE INVENTION

The present invention relates to a semiconductor memory and, more particularly, to a technique which may be effectively utilized in, for example, a mask ROM (Read-Only Memory) incorporating an ECC (Error Correcting Code) circuit.

The applicant of this application has previously developed a mask ROM (product name "HN62301") which incorporates an ECC circuit. This mask ROM incorporates an ECC circuit which effects error correction with respect to one bit among 32 bits by employing a Hamming code. Accordingly, the mask ROM is able to correct any error in memory data by virtue of the ECC circuit, which means that it is possible to increase the product yield and improve the reliability.

The above-described mask ROM suffers, however, from the following problem. Since the ECC circuit is arranged such that 32 bits which constitute one input signal are simultaneously processed for error correction, the size of an error correcting circuit is undesirably increased, and this leads to an increase in the size of the ECC circuit. As a result, the chip size is increased about 25%, disadvantageously.

SUMMARY OF THE INVENTION

Noting that the 32-bit signal is output from the above-described mask ROM eight bits at a time in a time-division manner, the present inventor has found that it is not necessary for the error correcting circuit in the ECC circuit to simultaneously process the 32 bits of one input signal.

It is a primary object of the present invention to provide a semiconductor memory so designed that the ECC circuit incorporated therein has a reduced size.

According to the present invention, among a plurality of bits which are simultaneously read out from a memory array, a plurality of bits which are to be simultaneously output to the outside of the IC are selected by a selecting means which is provided in a stage previous to the error correcting circuit. In consequence, it is possible to reduce the number of bits of a signal which need to be processed by the error correcting circuit at a time. Accordingly, it is possible to reduce the size of the ECC circuit.

DESCRIPTION OF THE PREFERRED EMBODIMENTS

Figure 1:
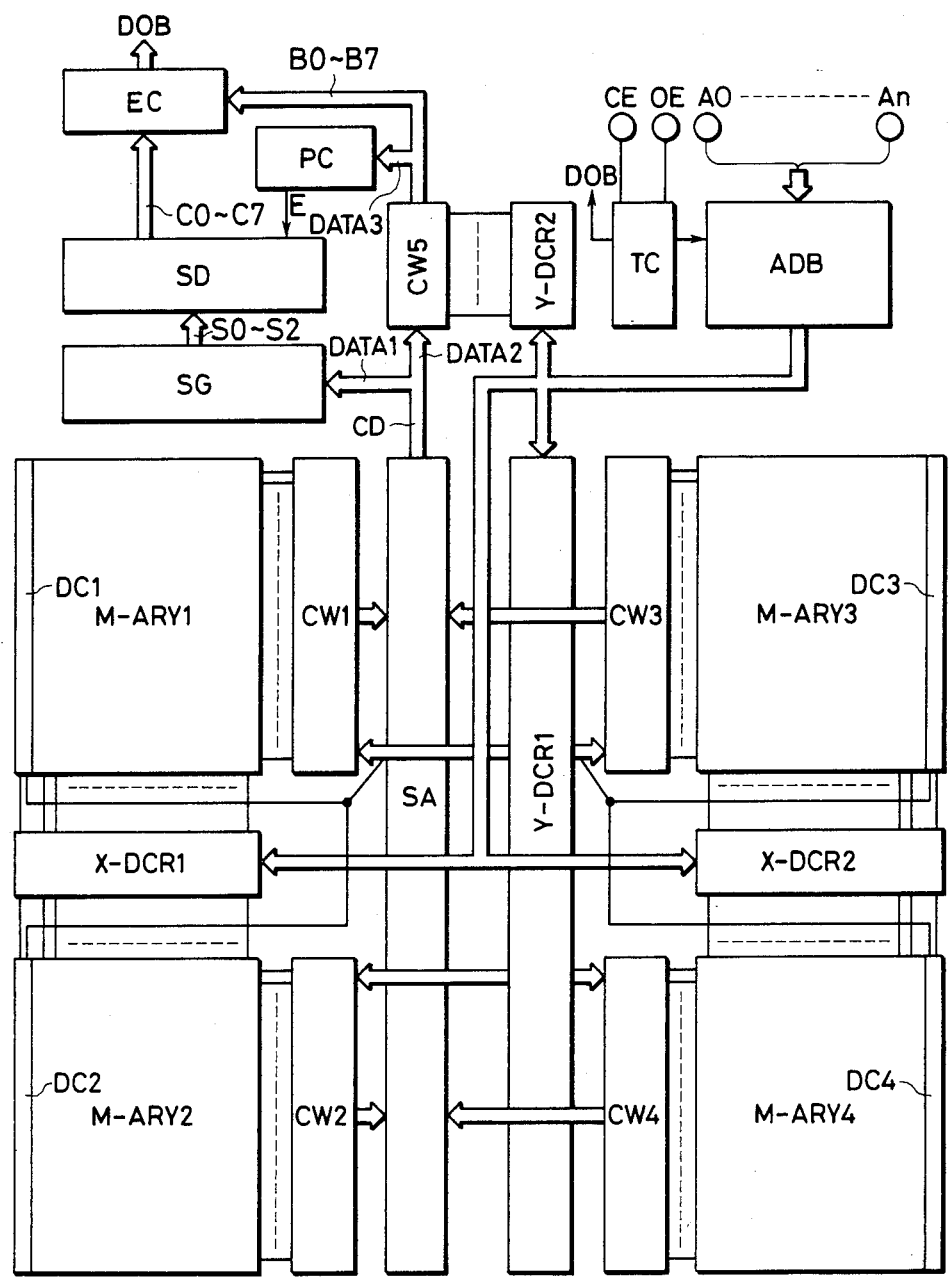
FIG. 1 is a block diagram of a mask ROM to which one embodiment of the present invention is applied.

Each of the circuit blocks shown in FIG. 1 is constituted by MOSFET's (Metal Oxide Semiconductor Field-Effect Transistors) formed on a semiconductor substrate by a known CMOS (Complementary Metal Oxide Semiconductor) integrated circuit manufacturing technique.

The mask ROM in accordance with this embodiment is arranged such as to allow data to be read out eight bits at a time, and has a memory capacity which enables 8×256 kilobits, i.e., about two megabits to be read out as a whole, although this is not necessarily limitative.

Four memory arrays M-ARY1 to M-ARY4 store data and parity bits which can be read out within the above-described memory capacity.

In accordance with this embodiment, unit memory data which is read out from the memory arrays M-ARY1 to M-ARY4 at a time consists of 39 bits. More specifically, the unit memory data is composed of four sets of 8-bit data (data consisting of a plurality of bits, such as 8-bit data, will also be referred to as a "group of data or a set of data", hereinafter) and seven parity bits. The group of parity bits consists of four parity bits which are provided so as to have one to one correspondence to the four groups of data for the purpose of enabling detection of a possible error in each group of data (these parity bits will hereinafter be referred to as "detection parity bits") and three parity bits for error correction. The parity bit arrangement in accordance with this embodiment enables a reduction in the number of circuit elements required to constitute an error correcting circuit and also a reduction in the number of wirings required between circuits, as described later.

Each unit memory data may be stored in each memory array without being distributed among a plurality of memory arrays. In accordance with this embodiment, however, each unit memory data is distributively stored in a plurality of memory arrays in consideration of the following fact.

Namely, a semiconductor device such as a mask ROM which is fabricated by a semiconductor integrated circuit manufacturing technique involves a fear of defects simultaneously appearing in a plurality of elements which are adjacent to each other due to contaminative particles having a relatively large size as compared with fine or minute elements (such defects will hereinafter be referred to as a "group defect"). If unit memory data consisting of a plurality of bits is held in a plurality of memory cells which are adjacent to each other, a plurality of bits may simultaneously be made erroneous by the occurrence of a group defect, which means that it may be practically impossible to effect error correction. It should be noted that defects include not only a defect of each memory cell itself but also an apparent defect produced by disconnection or shorting of a word line or a data line to which each memory cell is connected, a column switch circuit to which each data line is connected, etc.

The occurrence of the phenomenon that a plurality of bits in unit memory data are made erroneous due to a group defect is effectively prevented by holding various bits constituting the unit memory data in memory cells, respectively, which are adequately spaced apart from each other.

In accordance with this embodiment, among 39 bits of memory data, 20 bits are written into either the memory arrays M-ARY1 or M-ARY3, and the remaining 19 bits are written into the memory array M-ARY2 or M-ARY4 although this is not necessarily limitative.

In consequence, the memory capacity of the memory arrays M-ARY1 and M-ARY3 and that of the memory arrays M-ARY2 and M-ARY4 are different from each other.

For example, each of the memory arrays M-ARY1 and M-ARY3 has a memory capacity of 512 rows × 1,280 columns, i.e., 655,360 bits, whereas each of the memory arrays M-ARY2 and M-ARY4 has a memory capacity of 512 rows×1,216 columns, i.e., 622,592 bits.

Row address select lines (word lines) in the memory arrays M-ARY1 to M-ARY4 are selected by address decoders X-DCR1 and X-DCR2 each including a word line driver (not shown). Each of the row address decoders X-DCR1 and X-DCR2 forms 512 different kinds of address decoded output signals in response to 10-bit row address signals A0 to A9. Among the 10-bit row address signals A0 to A9, an appropriate one bit such as the highest-order bit is practically regarded as an array identification signal. Among a total of 1,024 different kinds of address decoded output signals which are output from two decoders X-DCR1 and X-DCR2, only one address decoded output signal which corresponds to the row address signals A0 to A9 is brought to a select level.

The 512 different kinds of address decoded output signals formed in the address decoder X-DCR1 are supplied to the left-hand side (as viewed in FIG. 1) memory arrays M-ARY1 and M-ARY2 in common. The 512 different kinds of address decoded output signals formed in the address decoder X-DCR2 are supplied to the right-hand side memory arrays M-ARY3 and M-ARY4 in common. In accordance with this embodiment, each of the address decoders X-DCR1 and X-DCR2 includes a decoder for dummy cell matrices DC1 to DC4 which will be described later. The address decoder X-DCR1 is adapted such that, when the row address select lines in the memory arrays M-ARY3 and M-ARY4 are to be selected by the address decoder X-DCR2, the address decoder X-DCR1 outputs a decoded signal which activates the dummy cell matrices DC1 and DC2. Similarly, the address decoder X-DCR2 is adapted such that, when the row address lines in the memory arrays M-ARY1 and M-ARY2 are to be selected by the address decoder X-DCR1, the address decoder X-DCR2 outputs a decoded signal which activates the dummy cell matrices DC3 and DC4.

In accordance with this embodiment, column switch circuits CW1 and CW3 are simultaneously activated so that, when data which is read out from the memory array M-ARY1 is to be supplied to a sense amplifier SA (described later), a reference voltage from the dummy cell matrix DC3 is supplied to the sense amplifier SA, and when the data which is read out from the memory array M-ARY3 is to be supplied to the sense amplifier SA, a reference voltage from the dummy cell matrix DC1 is supplied to the sense amplifier SA. Similarly, column switch circuits CW2 and CW4 are activated simultaneously.

A column address decoder Y-DCR1 is adapted to receive 6-bit column address signals A10 to A15 and form 64 different kinds of address decoded signals which are to be supplied to the column switch circuits CW1 and CW3 and 64 different kinds of address decoded output signals which are the same as 64 different kinds of address decoded signals which are to be supplied to the column switch circuits CW2 and CW4. Each of the column switch circuits CW1 and CW3 is arranged such as to select 20 rows at the same time in response to one address decoded output signal since each of the memory arrays M-ARY1 and M-ARY3 has 1,280 rows as described above. Each of the column switch circuits CW2 and CW4 is arranged such as to select 19 rows at the same time in response to one address decoded output signal since each of the memory arrays M-ARY2 and M-ARY4 has 1,216 rows.

Accordingly, a total of 39 bits of memory data, including 20 bit from either the memory array M-ARY1 or M-ARY3 and 19 bits from either the memory array M-ARY2 or M-ARY4, are read out by one addressing, i.e., a combination of an output signal from either the X-address decoder X-DCR1 or X-DCR2 and an output signal from one Y-address decoder Y-DCR1.

In the 39-bit unit memory data, the parity bits have respective levels which are determined on the basis of a parity bit check matrix such as that shown Table 1.

In Table 1, B00 to B73 respectively denote check bit Nos., and BP0 to BP2 denote error correction parity bits. The numeral 1 in Table 1 represents the logic "1", and the blank represents the logic "0".

TABLE 1

Check Matrix

| Syndrome | B00 | B01 | B02 | B03 | B10 | B11 | B12 | B13 | B20 | B21 | B22 | B23 | B30 | B31 | B32 | B33 | B40 | B41 | B42 |
|---|---|---|---|---|---|---|---|---|---|---|---|---|---|---|---|---|---|---|---|
| S0 | | | | | | | | | | | | | 1 | 1 | 1 | 1 | | | |
| S1 | | | | | | | | | 1 | 1 | 1 | 1 | | | | | 1 | 1 | 1 |
| S2 | | | | | 1 | 1 | 1 | 1 | | | | | | | | | 1 | 1 | 1 |

| B43 | B50 | B51 | B52 | B53 | B60 | B61 | B62 | B63 | B70 | B71 | B72 | B73 | BP0 | BP1 | BP2 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | | | |
| 1 | | | | | 1 | 1 | 1 | 1 | | | | | | 1 | |
| 1 | 1 | 1 | 1 | 1 | | | | | 1 | 1 | 1 | 1 | | | 1 |

Table 2 shows 32-bit data D00 to D73 which are written into the memory arras and an example of error correction parity bits P0 to P2 which are determined in correspondence to the 32-bit data. A first group of data consists of D00, D10, D20, D30, D40, D50, D60 and D70; a second group of data consists of D01, D11, D21, D31, D41, D51, D61 and D71; a third group of data consists of D02, D12, D22, D32, D42, D52, D62 and D72; and a fourth group of data consists of D03, D13, D23, D33, D43, D53, D63 and D73.

TABLE 2

| D00 | D01 | D02 | D03 | D10 | D11 | D12 | D13 | D20 | D21 | D22 | D23 | D30 | D31 | D32 | D33 | D40 | D41 | D42 | D43 | D50 |
|---|---|---|---|---|---|---|---|---|---|---|---|---|---|---|---|---|---|---|---|---|
| | | | | | | | | | | | | 1 | 1 | 1 | 1 | | | | | 1 |

| D51 | D52 | D53 | D60 | D61 | D62 | D63 | D70 | D71 | D72 | D73 | P0 | P1 | P2 |
|---|---|---|---|---|---|---|---|---|---|---|---|---|---|
| 1 | 1 | 1 | | | | | | | | | | | |

A method of determining the respective levels of the parity bits P0 to P2 shown in Table 2 will be explained below.

As shown in the check matrix of Table 1, the parity bit BP0 corresponds to a syndrome S0. Therefore, the data bits D30 to D33 and D50 to D73 (shown in Table 2) which respectively correspond to the check bits B30 to B33 and B50 to B73 designated in the column of the syndrome S0 in Table 1 are referred to. The level of the parity bit P0 is determined in such a manner that, when the number of "1" in the reference data bits D30 to D33 and D50 to D73 is odd, the level of the parity bit P0 is set at "1", whereas said number is even, the level of the parity bit P0 is set at "0". In the case of Table 2, eight data bits among the data bits which are referred to has the logic "1", and the level of the parity bit P0 is consequently set at "0".

Similarly, the levels of the parity bits P1 and P2 are set at "0" and "0", respectively, by making reference to the data in Table 2 on the basis of the check matrix shown in Table 1.

In accordance with this embodiment, the sense amplifier SA which reads out data from selected memory cells is constituted by a differential circuit, although this is not necessarily limitative. A reference voltage required for the sense amplifier SA is formed by dummy cell matrices DC1 to DC4. More specifically, when memory cells in the left-hand side memory arrays M-ARY1 and M-ARY2 are to be selected, the right-hand side dummy cell matrices DC3 and DC4 which form the reference voltage are selected in accordance with one level of the array identification signal, whereas, when memory cells in the right-hand side memory arrays M-ARY3 and M-ARY4 are to be selected, the left-hand side dummy cell matrices DC1 and DC2 are selected in accordance with the other level of the array identification signal. Each of the dummy cells (not shown) which constitute each dummy cell matrix is adapted to have a conductance substantially a half that of a selected memory cell. Such conductance, which is substantially a half that of a selected memory cell, can be obtained by, for example, series-connecting two elements each having the same arrangement as that of a memory cell. The operation of each dummy cell is also controlled by the column address decoder Y-DCR1, although this is not necessarily limitative. For this purpose, for example, the output of the decoder Y-DCR1 is supplied to the control electrode of one of the two series-connected elements, and the output of either the decoder X-DCR1 or X-DCR2 is supplied to the control electrode of the other element. It should be noted that the two series-connected elements may have a common control electrode, and a switching element may be connected in series to these series-connected elements. In such arrangement, among the dummy cells which have one to one correspondence to the rows in each memory arrays, only a dummy cell which corresponds to a row to be selected is activated, so that it is possible to prevent wasteful current consumption in the circuit as a whole.

Among the data read out from 39 memory cells which are designated by one X-address decoded output signal and one Y-address decoded output signal, data 1 which consists of 32-bit memory data and three error correction parity bits added thereto is supplied to a syndrome generator SG which constitutes an ECC circuit. Among the data read out from the 39 memory cells, data 2 which consists of the above-described 32 bits and a total of four detection parity bits corresponding thereto is supplied to a column switch circuit CW5. The column switch circuit CW5 receives four different kinds of decoded output formed by the Y-address decoder Y-DCR2 which receives, for example, A16 and A17, and the column switch circuit CW5 selects data 3 from the data 2, the data 3 consisting of a total of eight bits of memory data corresponding to each set of data and one parity bit added thereto.

The data 3 is supplied to a parity check circuit PC where parity check of the selected data 3 is performed.

The syndrome generator SG receives a total of 32 bits of memory data consisting of eight 4-bit sets and the three parity bits, and forms a detection signal, i.e., syndromes S0 to S2, for detecting any one of the eight sets to which a data bit erroneously read out may belong.

Table 3 shows a case where the data bit D11 is erroneously read out when the memory data shown in Table 2 is read out.

TABLE 3

| D00 | D01 | D02 | D03 | D10 | D11 | D12 | D13 | D20 | D21 | D22 | D23 | D30 | D31 | D32 | D33 | D40 | D41 | D42 | D43 | D50 |
|-----|-----|-----|-----|-----|-----|-----|-----|-----|-----|-----|-----|-----|-----|-----|-----|-----|-----|-----|-----|-----|
|     |     |     |     |     | 1   |     |     |     |     |     |     | 1   | 1   | 1   | 1   |     |     |     |     | 1   |

| D51 | D52 | D53 | D60 | D61 | D62 | D63 | D70 | D71 | D72 | D73 | P0 | P1 | P2 | S0 | S1 | S2 |
|-----|-----|-----|-----|-----|-----|-----|-----|-----|-----|-----|----|----|----|----|----|----|
| 1   | 1   | 1   |     |     |     |     |     |     |     |     |    |    |    |    |    | 1  |

In the case of the readout data shown in Table 3, a syndrome S0 which is to be obtained is determined as follows. Even parity check is first performed with respect to the data bits D30 to D33, D50 to D73 and the parity bit P0 which respectively correspond to the check bits B30 to B33, B50 to B73 and BP0. As a result, since the number of "1" is eight (an even number), the syndrome S0 is set at "0". A practical example of a circuit for performing parity check will be explained below in detail with reference to FIGS. 2 and 3. As to the syndrome S1, even parity check is performed with respect to the data bits D20 to D23, D40 to D43, D60 to D73 and the parity bit P1 which are referred to on the basis of Table 1, and since the result of the parity check shows that there is no error, the syndrome S1 is set at "0". The syndrome S2 is set at "1" due to the fact that an error bit D11 is present in the data bits which are referred to.

A syndrome decoder SD receives an error signal E which is formed by the parity check circuit PC, decodes the above-described detection signals S0 to S2 and forms correction signals C0 to C7 which designate one set of data including an erroneously readout bit among the eight sets of data. When the address signal which is supplied to the second column address decoder Y-DCR2 represents the first group of data D00, D10, D20, D30, D40, D50, D60 and D70 in Table 3, the output E of the parity check circuit PC has a level which represents the fact that the first group of data has no error. In consequence, each of the correction signals C0 to C7 is brought to a non-correction level. When the address signal represents the second group of data D01, D11, D21, D31, D41, D51, D61 and D71, the output E is brought to an error detection level due to the fact that the bit D11 is an error bit. In this case, one of the correction signals C0 to C7 which corresponds to the bit D11 is set at a correction level in accordance with the output E and the syndromes S0 to S2.

An error correcting circuit EC selectively effects error correction of the selected readout signals D0 to D7 in accordance with the correction signals C0 to C7. More specifically, when the parity error signal E represents the fact that there is no error, all the correction signals C0 to C7 are determined to be non-correction signals of the logic "0", whereas, when the parity error signal E represents the fact that there is an error, a specific one bit in the correction signals C0 to C7 is set at the logic "1". The error correcting circuit EC is constituted by eight exclusive-OR circuits as described later and adapted to make correction by practically inverting a read out signal corresponding to the bit set at the logic "1". It should be noted that the output signal from the error correcting circuit EC, that is, a group of data consisting of eight bits, is delivered to external terminals via a data output circuit DOB (not shown).

An address buffer ADB receives address signals A0 to An which are supplied from external terminals, form internal address signal which are in-phase with respect to the external address signals A0 to An and internal address signals which are out-of-phase with respect to the signals A0 to An, and delivers the internal address signals to the address decoders X-DCR1, X-DCR2 and Y-DCR1, Y-DCR2. In this embodiment, since 8-bit memory data per word is read out from about 2M bits of memory data as described above, address terminals are constituted by 18 bits from A0 to A17.

A timing control circuit TC receives a chip select signal $\overline{CE}$ which is supplied from an external terminal and an output enable signal $\overline{OE}$ (although this is not necessarily limitative) and forms various operation control signals for activating internal circuits such as the address buffer ADB and the data output circuit DOB.

Figure 2:
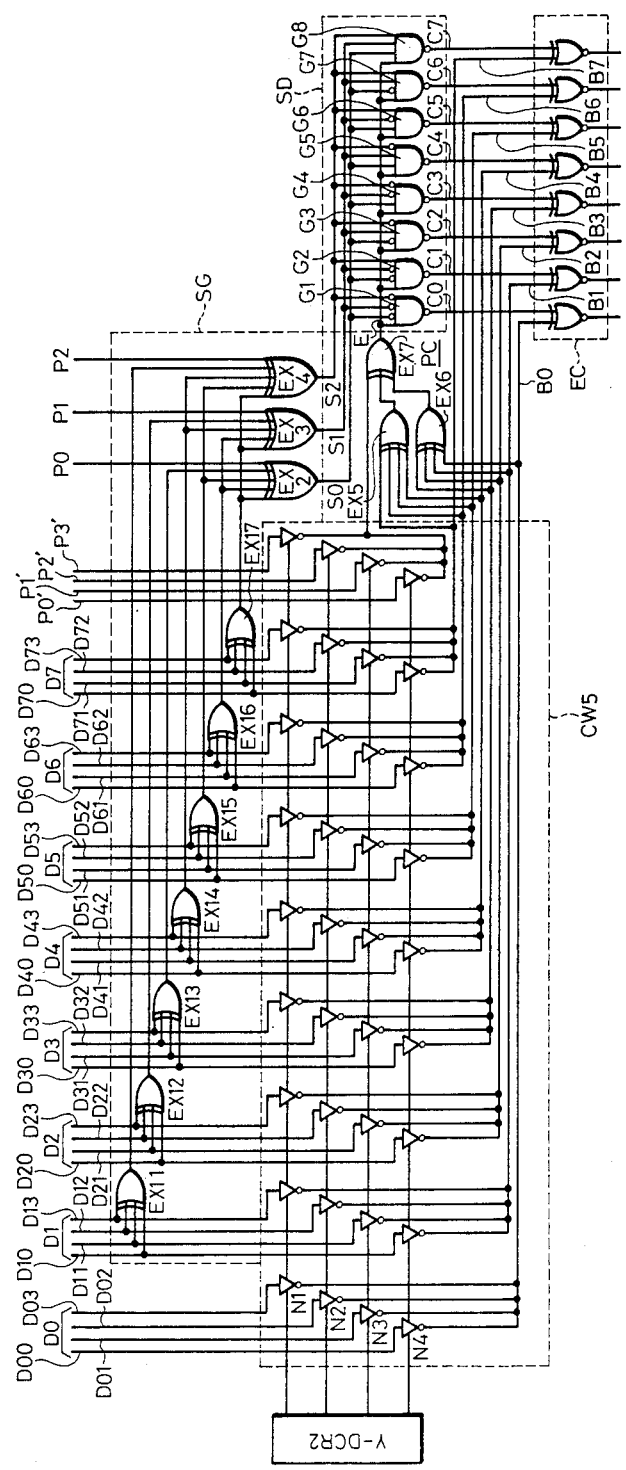
FIG. 2 is a circuit diagram of a practical example of an ECC circuit according to the present invention.

FIG. 2 is a circuit diagram of one practical example of the above-described error correcting circuit.

A signal which is read out from the memory arrays consists of a total of 39 bits including a total of 32 bits of data signal consisting of a total of eight 4-bit sets D0 to D7, four parity bits P0' to P3', and three parity bits P0 to P2. The 32-bit data signal consists of a first group of data (D00, D10, D20, D30, D40, D50, D60 and D70), a second group of data (D01, D11, D21, D31, D41, D51, D61 and D71), a third group of data (D02 D12, D22, D32, D42, D52, D62 and D72), and a fourth group of data (D03, D13, D23, D33, D43, D53, D63 and D73). The four parity bits P0' to P3' are provided so as to correspond to the four groups of data, respectively. The three parity bits P0 to P2 are provided for the purpose of correcting a possible error in any one of the eight sets of data D0 to D7.

The syndrome generator SG has a plurality of logic circuits EX11 to EX17 such as those illustrated for detecting whether the number of "1" in the four bits in each of the sets of data D1 to D7 except for the first set of data D0 is odd or even. The 4-bit signal of the second set of data D1 is supplied to the logic circuit EX11 so as to check whether the number of the logic "1" is odd or even. This logic circuit EX11 is equivalent to an even parity check circuit consisting of a plurality of two-input exclusive-OR circuits which are pyramid-connected, and performs even parity check of the above-described 4-bit readout signal. Similar logic circuits EX12 to EX17 are also provided for the other sets of data D2 to D7, respectively. The respective output signals from the logic circuits EX11 to EX17, together with the parity bits P0 to P2, supplied to logic circuits EX2 to EX4.

More specifically, for example, the respective outputs of the circuits EX13, EX15, EX16 and EX17 and the parity bit P0 are supplied to the logic circuit EX2 as will be clear from the illustrated connection. The logic circuits EX13 and EX15 to EX17 are adapted to receive the data bits D30 to D33 and D50 to D73, respectively, as will be clear from the illustrated connection. In consequence, the logic circuit EX2, together with the logic circuit EX13 and EX15 to EX17, constitutes an even parity check circuit with respect to the data bits D30 to D33, D50 to D73 and the parity bit P0. Accordingly, the output of the logic circuit EX2 becomes the syndrome S0 as will be understood by making reference to the check matrix shown in Table 1.

Similarly, the outputs of the logic circuits EX3 and EX4 become the syndromes S1 and S2, respectively.

As will be clear from the check matrix shown in Table 1, 3-bit combinations of the syndromes S0 to S2 are allowed to have one to one correspondence to a set of data in which an error is present among the sets of data D1 to D7. It should be noted that, when all the syndromes S0 to S2 have the logic "0", there may be two cases where no error is present in any of the sets of data D0 to D7 and where an error is present in the first set of data D0. Therefore, it is not possible to specify whether or not an error is present in the first set of data D0 by using the combinations of the syndromes S0 to S2 alone. However, when a signal B0 which is selected from the first set of data D0 is erroneous, the logic level of the output signal E from the parity check circuit PC is set at "1" as will be described later; therefore, a NAND circuit G1 which receives the syndromes S0 to S2 and the output signal E can form a signal which designates correction.

The 32-bit readout signal consisting of eight sets of data and the parity bits P0' to P3' added thereto are passed through the column switch circuit CW5 where they are selected bitwise. In this embodiment, the column switch circuit CW5 is constituted by clocked inverter circuits (or tri-state output circuits) N1 to N4 which are respectively connected at clock terminals or operation control terminals thereof to the output terminals of the second column address decoder Y-DCR2, although this is not necessarily limitative. The following is a description of the operation of the column switch circuit CW5 having such arrangement, for example, the operation of the clocked inverter circuits N1 to N4 corresponding to the first set of data D0. Namely, in response to four different kinds of decoded outputs (select signals) which are formed by the Y-address decoder Y-DCR2, one of the clocked inverter circuits N1 to N4 is made operative, while the remaining three circuits are brought into an output high-impedance state. In consequence, the signal of a bit corresponding to the clocked inverter circuit which has been made operative is transmitted to the output B0. Clocked inverter circuits which respectively correspond to the other sets of data D1 to D7 and the parity bits P0' to P3' are operated in a manner similar to the above. In consequence, one bit signal is selected from each of the sets of data D1 to D7, and output signals B1 to B7 are thereby formed.

A total of nine bit signals selected by the column switch circuit CW5 are supplied to the parity check circuit PC so as to detect whether or not an error is present therein. The parity check circuit PC is constituted by logic circuits EX5 to EX7 each having an arrangement similar to that of the above-described logic circuits EX11 and the like. More specifically, each of the logic circuits EX5 and EX6 makes judgement as to whether the number of the logic "1" in each of the groups of 4-bit signals B0 to B3 and B4 to B7 is odd or even. These judgement output signals and the above-described selected parity bit are supplied to a logic circuit EX7 to make judgement similarly as to whether the number of the logic "1" is odd or even. When there is no error, i.e., when the number of the logic "1" is even, the output signal E from the parity check circuit PC has the logic "0". It should be noted that, since in this embodiment inverter circuits are used to constitute the column switch circuit CW, the number of the logic "0" is checked in practice.

The syndrome decoder SD is constituted by NAND gate circuits G1 to G8. The output signal E from the parity check circuit PC is mutually supplied to these NAND gate circuits G1 to G8.

The error correcting circuit EC is, as illustrated, constituted by a plurality of exclusive-OR circuits which respectively receive the output signals C0 to C7 from the syndrome decoder SD and the output signals B0 to B7 from the column switch CW5.

The respective operations of the syndrome decoder circuit SD and the error correcting circuit EC are as follows. When there is no error in the above-described selected 8-bit readout signals B0 to B7, the output signal E has the logic "0", so that all the output signals C0 to C7 from the syndrome decoder circuit SD are set to the logic "1". In other words, the syndrome decoder SD outputs the signals C0 to C7 each having a level which represents that no correction is needed independently of the output signals S0 to S2 from the syndrome generator SG. In consequence, the error correcting circuit EC consisting of the exclusive-OR circuits adapted to receive the readout signals B0 to B8 and the correction signals C0 to C8 inverts all the readout signals B0 to B7 and outputs the inverted signals. This is done because, since the column switch circuit CW5 inverts the readout signals as described above, the inverted signals are returned to the previous levels by the inversion effected by the error correcting circuit EC, thereby practically effecting a non-correction operation.

When an error is present in the 8-bit readout signal selected by the column switch circuit CW5, the output E is set to the logic "1". In this case, the NAND gate circuits G1 to G8 which constitute in combination the syndrome decoder circuit SD decode the output signals S0 to S2 from the syndrome generator SG and operate in such a manner that one of the output signals C0 to C7, i.e., a signal corresponding to one of the eight sets of data in which an error is present, has the logic "0". In consequence, the error correcting circuit EC, which is constituted by the exclusive-OR circuits adapted to receive the readout signals B0 to B7 and the correction signals C0 to C7, outputs a signal among the readout signals B0 to B7 which corresponds to the decoded signal having the logic "0" as it is, but inverts the remaining seven bit signals before they are output. Thus, error correction is effected.

It should be noted that, when the column switch circuit CW5 is arranged such as to output a signal which is in-phase with respect to the input as in the case where the circuit CW5 is constituted by switching circuits each defined by a transfer gate MOSFET, the syndrome decoder circuit SD is preferably formed using, for example, AND gate circuits or the like so as to deliver a signal having the logic "1" with respect to a bit which is to be subjected to error correction. In such case, the exclusive-OR circuits which constitute in combination the error correcting circuit EC are adapted to invert a bit corresponding the above-described logic "1".

In addition, since a 32-bit signal and parity bits associated therewith are read out in this embodiment, it is also possible to read out data serially in four divided operations, eight bits at a time, by switching the 2-bit address signals A16 and A17 supplied to the address decoder Y-DCR2.

Figure 3:
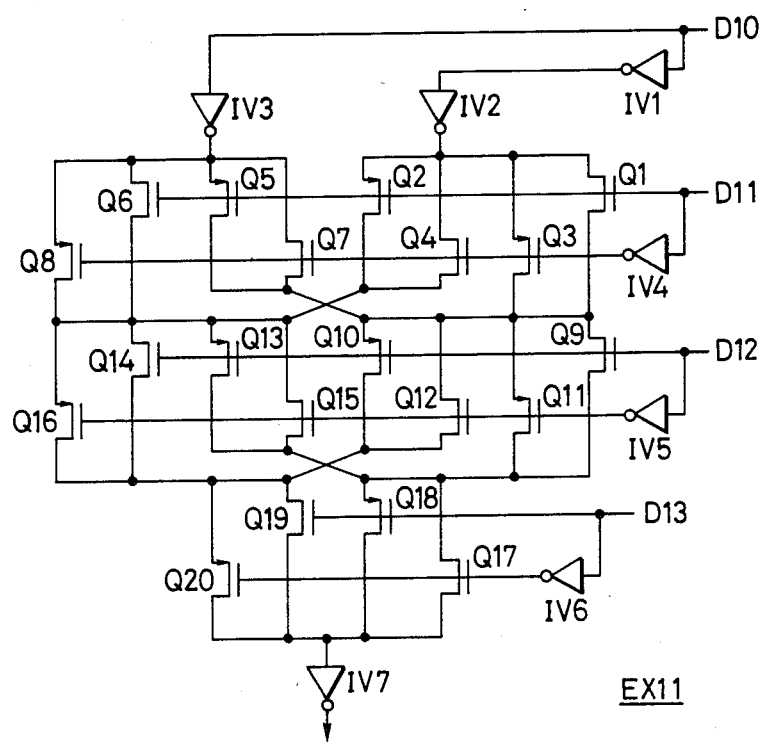
FIG. 3 is a circuit diagram of a practical example of a logic circuit employed in the arrangement shown in FIG. 2.

FIG. 3 is a circuit diagrams of one practical example of the above-described logic circuit EX11. Various circuit elements shown in FIG. 3 are fabricated on a single semiconductor substrate such as a single crystal silicon by a known CMOS (Complementary Metal-Oxide Semiconductor) integrated circuit manufacturing technique. In FIG. 3, each of the MOSFET's whose source is shown by an arrowed line is a P-channel MOSFET.

Although not necessarily limitative, this integrated circuit is fabricated on a semiconductor substrate made of single crystal P-type silicon. Each of the N-channel MOSFET's is composed of source and drain regions which are formed on the surface of such semiconductor substrate and a gate electrode which is made of, for example, poly-silicon formed on the surface of a portion of the semiconductor substrate between the source and drain regions through a thin gate insulating film. Each of the P-channel MOSFET's is fabricated in an N-type well region formed on the surface of the semiconductor substrate.

One signal D10 among the four input signals D10, D11, D12 and D13 are formed into complementary signals by inverter circuits IV1 to IV3. More specifically, the signal D10 is inverted by the inverter circuit IV3 so as to be opposite in terms of phase to the input signal. The signal D10 is also inverted by the inverter circuit IV1 and inverted again by the inverter circuit IV2 so as to be in-phase with respect to the input signal. The inverter circuits IV2 and IV3 are adapted to have a relatively large driving capacity.

One of these complementary signals is transmitted to an output inverter circuit IV7 through transfer gate MOSFET's formed from combinations of N- and P-channel MOSFET's. The arrangement of a network constituted by these transfer gate MOSFET's will be explained together with the operation thereof described below.

For example, when all the four signals D10, D11, D12 and D13 have the logic "0" which is represented by a low level, a P-channel MOSFET Q18 and an N-channel MOSFET Q17 which is disposed in parallel to the MOSFET Q18 and constitutes a right-hand side branch together with the MOSFET Q18 are turned ON in response to the fall of the signal D13 to the low level.

In response to the fall of the signal D12 to the low level, an N-channel MOSFET Q9 and a P-channel MOSFET Q11 which constitute a right-hand side branch are turned OFF, and a P-channel MOSFET Q13 which is cross-connected to the branch corresponding to the signal D13 and an N-channel MOSFET Q15 which is disposed in parallel to the MOSFET Q13 and constitutes a left-hand side branch together with the MOSFET Q13 are turned ON.

In response to the fall of the signal D11 to the low level, an N-channel MOSFET Q6 and a P-channel MOSFET Q8 which constitute a left-hand side branch are turned OFF, and a P-channel MOSFET Q2 which is cross-connected to the branch corresponding to the signal D12 and an N-channel MOSFET Q4 which is disposed in parallel to the MOSFET Q2 and constitutes a right-hand side branch together with the MOSFET Q2 are turned ON. Accordingly, the output signal from the inverter circuit IV2, which is made to fall to the low level in response to the fall of the signal D10 to the low level, is transmitted to the output inverter circuit IV7, and a high-level output is thereby formed.

When, in the above-described state, the signal D10 alone is raised to the high level, a high-level signal is transmitted to the output inverter circuit IV7 through the transfer gate MOSFET's in the same path, so that a low-level output signal is formed.

When, in the above-described state, both the signals D10 and D11 are raised to the high level, an N-channel MOSFET Q1 and a P-channel MOSFET Q3 are turned ON in place of the P-channel MOSFET Q2 and the N-channel MOSFET Q4. However, this path is connected to the left-hand side path which is turned OFF by the signal D13, and is therefore made ineffective. Accordingly, the branch, which is constituted by the N-channel MOSFET Q6 and the P-channel MOSFET Q8 which are turned ON in response to the rise of the signal D11 to the high level, is made alive, so that the low-level output signal from the inverter circuit IV3 is transmitted to the output inverter circuit IV7 through the same path as tht selected by the signals D12 and D13, and a high-level output signal is thereby formed.

When, in the above-described state, both the signals D10 and D12 are raised to the high level, the high-level output signal from the inverter circuit IV2 is allowed to pass through the N-channel MOSFET Q1 and the P-channel MOSFET Q3 which are turned ON in response to the rise of the signal D11 to the high level and the N-channel MOSFET Q9 and the P-channel MOSFET Q11 which are turned ON in response to the rise of the signal D12 to the high level, and transmitted to the output inverter circuit IV7 through the same path as that selected by the signal D13, and a low-level output signal is thereby formed. It should be noted that the branch, which is constituted by the N-channel MOSFET Q6 and the P-channel MOSFET Q8 which are turned ON in response to the rise of the signal D11 to the high level, is connected to the branch which is turned OFF by the signal D13 through the N-channel MOSFET Q14 and the P-channel MOSFET Q16 which are turned ON in response to the rise of the signal D12 to the high level, and is therefore made ineffective.

For example, when the signal D13 is raised to the high level, the N-channel MOSFET Q19 and the P-channel MOSFET Q20 are turned ON. It is therefore possible to find the transmission path of the signal D13 by checking whether or not a branch is made effective by another signal in the left-hand side branch path. In this way, when the number of the logic "1" is odd, a low-level signal is delivered from the output inverter circuit IV7. Thus, an even parity check operation in which an error output is made to have the low level (the logic "0") is effected.

It is possible, in accordance with this embodiment, to form the logic circuit EX11 from a relatively small number of elements by combining together CMOS transfer gate circuits each constituted by N- and P-channel MOSFET's which are disposed in parallel to each other. Although a similar circuit function can be realized by employing three two-input exclusive-OR circuits and connecting them in a pyramid fashion, it is possible, according to the present invention, to reduce the number of required elements to a value which is smaller than that in the case of the above-described arrangement in which three two-input exclusive-OR circuits are pyramid-connected. In the case of a CMOS circuit, a total of four MOSFET's are required to constitute a two-input NAND or NOR circuit, and an exclusive-OR circuit needs four two-input NAND circuits; therefore, the number of required circuit elements can particularly be reduced by a large margin.

It should be noted that the logic circuits exemplified in the arrangement shown in FIG. 2, such as the 3- or 5-input logic circuit EX7 or EX2, may also be formed by a technique similar to the above.

Abovedescribed embodiment of the present invention enables the following advantages to be obtained.

(1) It is possible to reduce the number of signal bits which need to be handled in the ECC circuit by combining a set of error correction bits selected from each of a plurality of sets of data which constitute one memory data, each set of data consisting of a plurality of bits, and parity check bits each selected from each of the above-described sets of data. Accordingly, it is advantageously possible to simplify the arrangement of each of the logic circuits which have an exclusive-OR function and constitute a syndrome generator, a syndrome decoder and an error correcting circuit which define in combination an ECC circuit. In the mask ROM shown in FIG. 1, the ratio of the area which is occupied by a circuit for realizing an error correcting function with respect to the whole area of a semiconductor chip is greatly reduced, i.e., to about 10% or less.

(2) The simplification of the arrangement of the logic circuits realized by the advantage (1) enables a reduction in the power consumption.

(3) Employment of the second column switch circuit permits a reduction in the number of required wirings, so that the wiring area which is required in the semiconductor chip can sufficiently be minimized.

Although the invention accomplished by the present inventor has been practically described by way of one embodiment, it should be noted here that the present invention is not necessarily limited to the above-described embodiment and various changes and modifications may be imparted thereto without departing from the spirit and scope of the invention. For example, the combination of a readout signal and parity bits may be variously modified. For instance, the above-described four parity bits and three error correction parity bits may be added to a readout signal composed of 16 sets of data each consisting of four bits. Further, the bit pattern of a signal consisting of bits each seected from each of the sets of data may be adapted to have either odd or even parity. In this case, the above-described parity bits P' become, as a matter of course, unnecessary.

In addition, each circuit may have any type of practical circuit configuration, provided that it has a circuit function similar to the above.

Although the invention accomplished by the inventor of this application has mainly been described above by way of one embodiment in which the invention is applied to a mask ROM which is the background art thereof, the present invention is not necessarily limitative thereto, and it may similarly be applicable to, for example, erasable and programmable ROM's such as an EPROM (Electrically Programmable Read-Only Memory).

What is claimed is:

1. A semiconductor memory comprising:
    memory means for storing data;
    selecting means including means for receiving first memory data which is read out from said memory means and which is comprised of a pluarlity of sets of data each constituted by a plurality of bits, and means for selecting a predetermined bit from each of said plurality of sets of data to form second memory data comprised of a plurality of bits; and
    error correcting means for making error correction with respect to said second memory data, wherein said error correcting means performs said error correction on the basis of an output of a first detecting means for detecting any set of data in which an error is present among said plurality of sets of data, and on the basis of an output of second detecting means for detecting a possible error in said second memory data, wherein said first detecting means performs error detection on the basis of performing a logic operation on said first memory data and first parity bits, and said second detecting means performs error detection on the basis of performing a logic operation on said second memory data and second parity bits.

2. A semiconductor memory according to claim 1, wherein said first and second parity bits are stored in said memory means.

3. A semiconductor memory according to claim 2, wherein said memory means is a mask ROM.

4. A semiconductor memory according to claim 1, wherein each set of data is composed of four bits, the number of said plurality of sets of data being eight, the number of said first parity bits being three, and the number of said second parity bits being four.

* * * * *